United States Patent
Nair

(10) Patent No.: US 7,890,942 B2
(45) Date of Patent: Feb. 15, 2011

(54) ARRAY VALUE SUBSTITUTION AND PROPAGATION WITH LOOP TRANSFORMATIONS THROUGH STATIC ANALYSIS

(75) Inventor: Rohini Nair, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/505,148

(22) Filed: Aug. 15, 2006

(65) Prior Publication Data

US 2008/0046871 A1 Feb. 21, 2008

(51) Int. Cl.
*G06F 9/45* (2006.01)
*G06F 13/00* (2006.01)
*G06F 9/26* (2006.01)

(52) U.S. Cl. .................. 717/160; 717/150; 717/158; 711/137; 711/213

(58) Field of Classification Search ................... None
See application file for complete search history.

(56) References Cited

U.S. PATENT DOCUMENTS

| | | | |
|---|---|---|---|
| 6,079,006 A * | 6/2000 | Pickett | 711/213 |
| 6,199,201 B1 | 3/2001 | Lamping et al. | |
| 6,343,375 B1 | 1/2002 | Gupta et al. | |
| 6,487,716 B1 | 11/2002 | Choi et al. | |
| 7,089,370 B2 * | 8/2006 | Luick | 711/137 |
| 7,318,223 B2 * | 1/2008 | Blainey et al. | 717/160 |
| 2003/0065888 A1 * | 4/2003 | Nishiyama | 711/137 |
| 2003/0204840 A1 * | 10/2003 | Wu | 717/158 |
| 2004/0098711 A1 | 5/2004 | Song et al. | |
| 2008/0046870 A1 | 2/2008 | Nair et al. | |
| 2010/0023932 A1 * | 1/2010 | Eichenberger et al. | 717/160 |

FOREIGN PATENT DOCUMENTS

JP 2000066896 3/2000

OTHER PUBLICATIONS

"Simple and effective array prefetching in Java", Cahoon et al., Nov. 2002, pp. 86-95, <http://delivery.acm.org/10.1145/590000/583820/p86-cahoon.pdf>.*
"Optimizing aggregate array computations in loops", Liu et al., Jan. 2005, pp. 91-125, <http://delivery.acm.org/10.1145/1060000/1053471/p91-liu.pdf>.*

(Continued)

*Primary Examiner*—Thuy Dao
(74) *Attorney, Agent, or Firm*—Schmeiser, Olsen & Watts; William H. Steinberg

(57) ABSTRACT

A method and system for substituting array values (i.e., expressions) in a program at compile time. An initialization of an array is identified in a loop. The initialization is an assignment of an expression (i.e., a constant or a function of an induction variable to elements of the array). The expression is stored in a table that associates the expression with the array and indices of the array. An assignment statement is detected that is to assign at least one element of the initialized elements. The expression is retrieved from the table based on the expression being associated with the array and corresponding indices. The expression is substituted for the at least one element so that the expression is to be assigned by the assignment statement. The process of substituting array values is extended to interprocedural analysis.

20 Claims, 7 Drawing Sheets

OTHER PUBLICATIONS

"Combined instruction and loop parallelism in array synthesis for FPGAs", Derrien et al., Sep. 2001, pp. 165-170, <http://delivery.acm.org/10.1145/510000/500039/p165-derrien.pdf>.*

Cahoon, et al.; Recurrence analysis for effective array prefetching in Java; Concurrency and Computation: Practice and Experience; 2003; pp. 1-27.

Liu, et al.; Optimizing Aggregate Array Computations in Loops; ACM Transactions on Programming Languages and Systems; vol. 27, No. 1, Jan. 2005; ACM 0164-0925/05/0100-0091; pp. 91-125.

Cahoon, et al.; Simple and Effective Array Prefetching in Java; JGI'02, Nov. 3-5, 2002, Seattle, Washington, USA; ACM 1-58113-599-08/02/0011; pp. 86-95.

Pugh, et al.; Constraint-Based Array Dependence Analysis; ACM Transactions on Programming Languages and Systems; vol. 20, No. 3, May 1998; ACM 0164-0925/98/0500-0635; pp. 635-678.

Ogawa et al.; OMPI: Optimizing MPI Programs using Partial Evaluation; Proceedings of the 1996 ACM/IEEE Conference on Supercomputing, Pittsburgh, PA, USA 01-01 Jan. 1996, Piscataway, NY, USA, IEEE, Jan. 1, 1996; 18 pages.

Kleinrubatscher et al.; Fortran Program Specialization; ACM SIGPLAN Notices, vol. 30, No. 4, Apr. 1995; pp. 61-70, XP-002459522.

Samuel Z. Guyer and Calvin Lin; Optimizing the Use of High Performance Software Libraries; Languages and Compilers for Parallel Computing: 13th International Workshop, LCPC 2000, Yorktown Heights, NY, USA, Aug. 10-12, 2000, Lecture Notes in Computer Science, vol. 2017, 2001; pp. 227-243, XP-002459521.

Alt et al.; Cosy Compiler Phase Embedding with the COSY Compiler Model; Compiler Construction; International Conference, vol. 5th, Apr. 7, 1991; pp. 278-293, XP009082491.

Bacon et al.; Compiler Transformations for High-Performance Computing; ACM Computing Surveys, New York, NY, US, vol. 26, No. 4, Dec. 1994; pp. 345-420, XP002246513.

Bacon et al.; Fast Statis Analysis of C++ Virtual Function Calls; SIGPLAN Notices (ACM Special Interest Group on Programming Languages), vol. 31, No. 10; Oct. 1996; 19 pages.

K.V. Seshu Kumar; Value Reuse Optimization: Reuse of Evaluated math Library Function Calls Through Compiler Generated Cache; ACM SIGPLAN Notices, vol. 38(8); Aug. 2003; pp. 60-66.

Marino et al.; Abstract of Using Statis Analysis to Compile Non-sequential Functional Logic Programs; Practical Aspects of Declarative Languages. Second International Workshop, PADL 2000. Proceedings (Lecture Notes in Computer Science vol. 1753), Jan. 2000, Boston, MA, USA: p. 63.

* cited by examiner

*300*

| a | 0:99:3 | NULL |

| a | 0:49:9 | 50:99:3 | NULL |

| a | 0:49:9 | 50:99:3 | NULL |
| b | 0:49:9 | 50:99:3 | NULL |

| c | 50:99:i | NULL |

| a | 0:99:i | NULL |
|---|--------|------|
| b | 0:99:i*i | NULL |
| c | 0:99:i+10 | NULL |

| a | 0:99:i | NULL |
|---|--------|------|
| b | 0:99:i*i | NULL |
| c | expr(c[i]<50):(i+10+i):i*i | NULL |

| a | 0:99:i | NULL |
|---|--------|------|
| b | 0:99:(expr(c[i]<50):(i+10+i):i*i) | NULL |
| c | expr(c[i]<50):(i+10+i):i*i | NULL |

| a | 0:99:i | NULL |
|---|---|---|
| b | 0:99:i*i | NULL |
| c | 0:99:i+10 | NULL |

| a | 0:49:(i*i)+(i+10) | 50:99:i | NULL |
|---|---|---|---|
| b | 0:99:i*i | NULL | |
| c | 0:99:i+10 | NULL | |

| x | 0:size:(i-1)*(i+1) | NULL |
|---|---|---|

FIG. 6C

ARRAY VALUE SUBSTITUTION AND PROPAGATION WITH LOOP TRANSFORMATIONS THROUGH STATIC ANALYSIS

CROSS-REFERENCE TO RELATED INVENTION

This invention is related to U.S. patent application Ser. No. 11/505,070 entitled "COMPILE TIME EVALUATION OF LIBRARY FUNCTIONS", filed on even date herewith, assigned to the same assignee as the present application, and hereby incorporated herein by reference in its entirety.

FIELD OF THE INVENTION

The present invention relates to a method and system for substituting array values and propagating array values with loop transformations through static analysis.

BACKGROUND OF THE INVENTION

A main contribution to slowed performance in array-intensive embedded applications and multimedia applications is the large time disparity between processor cycles and main memory access. Most execution time associated with such applications is spent inside the applications' loops. Conventional tools that provide loop optimizations utilize loop restructuring and array regrouping. The scope of these tools is limited to a particular loop and the tools do not significantly reduce execution time. Thus, there exists a need to overcome at least one of the preceding deficiencies and limitations of the related art.

SUMMARY OF THE INVENTION

In first embodiments, the present invention provides a method of substituting array values in a program in a computing environment at compile time, the method comprising:

identifying an initialization of an array, the identifying performed at a compile time of a program being compiled by a compiler, the initialization including an assignment of an expression to a plurality of elements of the array via a loop in the program, the expression being one of a constant value and a function of an induction variable of the loop, the induction variable capable of being evaluated to each value of a set of values;

storing, at the compile time, the expression in a table residing in a memory, the table associating the expression with the array and with a plurality of indices of the array, the plurality of indices being dependent upon a subset of the set of values;

detecting, at the compile time, an assignment statement in the program, wherein at least one element of the plurality of elements is to be assigned by the assignment statement, the at least one element associated with at least one index of the plurality of indices in a one-to-one correspondence;

retrieving, at the compile time, the expression from the table, the retrieving based on the expression being associated by the table with the array and the at least one index; and substituting, in the program and at the compile time, the expression for the at least one element so that the expression is to be assigned by the assignment statement instead of the at least one element.

A system, computer program product and process for supporting computing infrastructure corresponding to the above-summarized method are also described herein.

Advantageously, the array value substitution technique of the present invention reduces execution time via reducing accesses of main memory. Further, being completely static, the technique of the present invention avoids any runtime checks. Still further, the present invention provides a generic array value substitution scheme that can be implemented for any programming language.

BRIEF DESCRIPTION OF THE DRAWINGS

FIG. 3A is an example of an entry in a table that stores array values in the process of FIGS. 2A-2B, where the entry is based on values being assigned to an array in a first loop, in accordance with embodiments of the present invention.

FIG. 3B is a modification of the entry of FIG. 3A based on values being assigned in a second loop, in accordance with embodiments of the present invention.

FIG. 3C is an example of the modified entry of FIG. 3B together with an additional entry associated with a copy loop, in accordance with embodiments of the present invention.

FIG. 4 is an example of an entry in the table of FIG. 3A, where the entry is based on a function of an induction variable, in accordance with embodiments of the present invention.

FIG. 5A is an example of three initial entries in a table that stores array values in the process of FIGS. 2A-2B, where the initial entries are stored prior to analyzing arrays across basic blocks, in accordance with embodiments of the present invention.

FIG. 5B depicts a modification of the third entry of FIG. 5A in response to array analysis across basic blocks, in accordance with embodiments of the present invention.

FIG. 5C depicts a modification of the second entry of FIG. 5B, in response to array analysis across basic blocks, in accordance with embodiments of the present invention.

FIG. 6A is an example of three initial entries in a table that stores array values in the process of FIGS. 2A-2B, where the initial entries are stored prior to an interprocedural array analysis, in accordance with embodiments of the present invention.

FIG. 6B depicts a modification to the first entry of FIG. 6A in response to an interprocedural array analysis with no local arrays, in accordance with embodiments of the present invention.

FIG. 6C is an example of an entry in a table that stores array values in the process of FIGS. 2A-2B, where the entry is generated by an interprocedural array analysis with a local array, in accordance with embodiments of the present invention.

DETAILED DESCRIPTION OF THE INVENTION

Overview

The present invention provides for a static analysis of array values (i.e., expressions) that is implemented by an add-on component to a compiler. The add-on component tracks array values utilized in array initializations and substitutes the array values for array elements that are to be assigned by other array operations. The array value tracking and substitution is performed across multiple loops within a procedure and can be propagated across procedures to reduce unnecessary accesses of memory (i.e., the static analysis is not constrained within a single loop).

Definitions

The following terms are used herein and are defined as follows:

Basic block: a piece of code that can be executed sequentially with one entry point and one exit point and without any branching in between.

Code Generator: A component of a back end of a compiler. A code generator transforms syntactically correct intermediate code or optimized code into an output language (e.g., the native machine code of a computing system).

Compiler: A computer program that translates source code in a high level programming language into machine code.

Compile time: The time period during which a compiler compiles a software program's source code into machine code.

Intermediate representation: A functionally equivalent form of source code that is in a different form that facilitates further transformation.

Optimizer: A component of the back end of a compiler. An optimizer applies optimization techniques to intermediate code obtained from a front end of a compiler to enhance the performance and/or reduce the size of the resulting machine code. Examples of optimization techniques include inline expansion, dead code elimination, constant propagation, constant folding, copy propagation, loop transformation, and register allocation.

Parser: A front end of a compiler. A parser performs language translation to convert source code from one language into target code or intermediate code in another language.

Static analysis: Analysis of software that is performed without executing programs built from that software.

Array Value Substitution System

Figure 1:
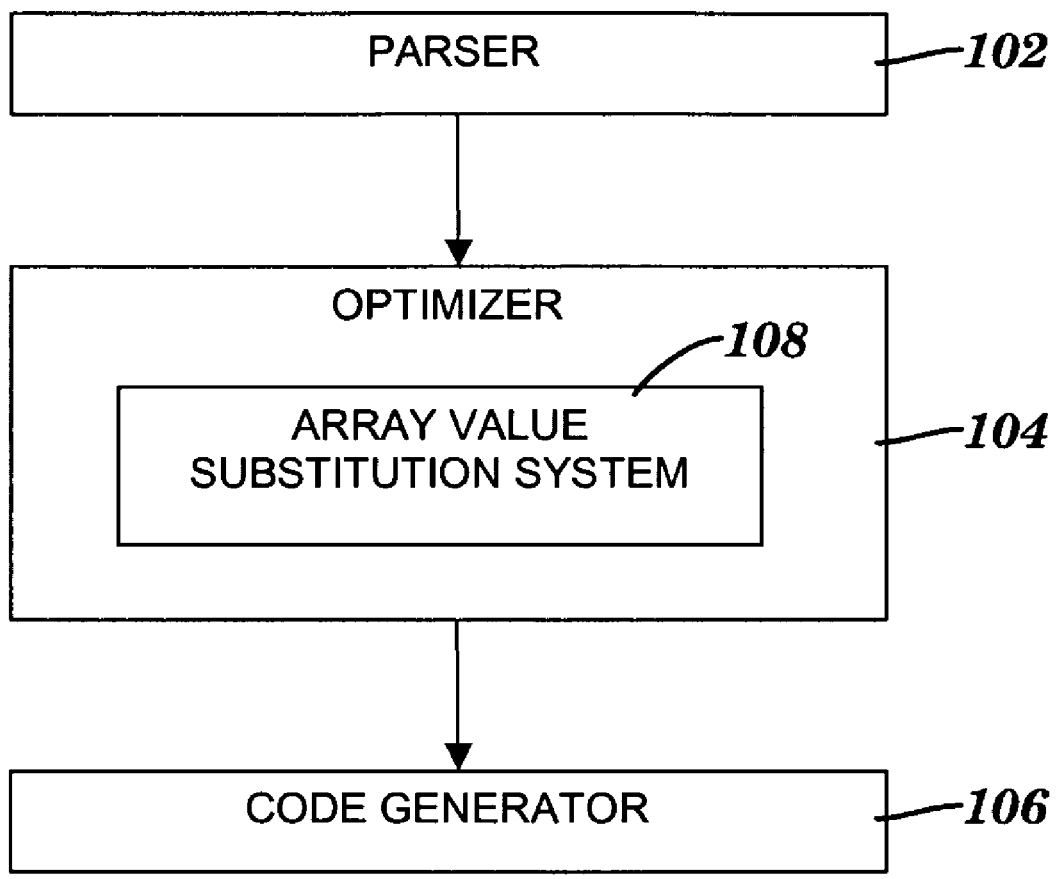
FIG. 1 is a block diagram of a system for array value substitution and propagation with loop transformations through static analysis, in accordance with embodiments of the present invention.

FIG. 1 is a block diagram of a system for array value substitution and propagation with loop transformations through static analysis, in accordance with embodiments of the present invention. A compiler 100 includes a parser 102, optimizer 104 and a code generator 106. Compiler 100 operates on a source program (not shown). The source program is received by parser 102. The parser converts the source code into intermediate code (a.k.a. an intermediate representation). The intermediate code is received by optimizer 104.

Optimizer 104 includes components to operate one or more optimizer phases that facilitate the generation of optimized code, thereby enhancing the performance and/or reducing the size of the machine code resulting from the compilation. In one embodiment, an array value substitution system 108 is implemented in optimizer 104 and performs an optimization phase. System 108 implements a static analysis that includes substituting array values and propagating the substituted values by utilizing loop transformations. The process of substituting and propagating array values is described below relative to FIGS. 2A and 2B. Optimized code generated by optimizer 104 is received by code generator 106, which transforms the optimized code into machine code, which can be executed by a computing system. In another embodiment, the array value substitution system is implemented in code generator 106 rather than in optimizer 104.

Array Value Substitution Process

Figure 2A:
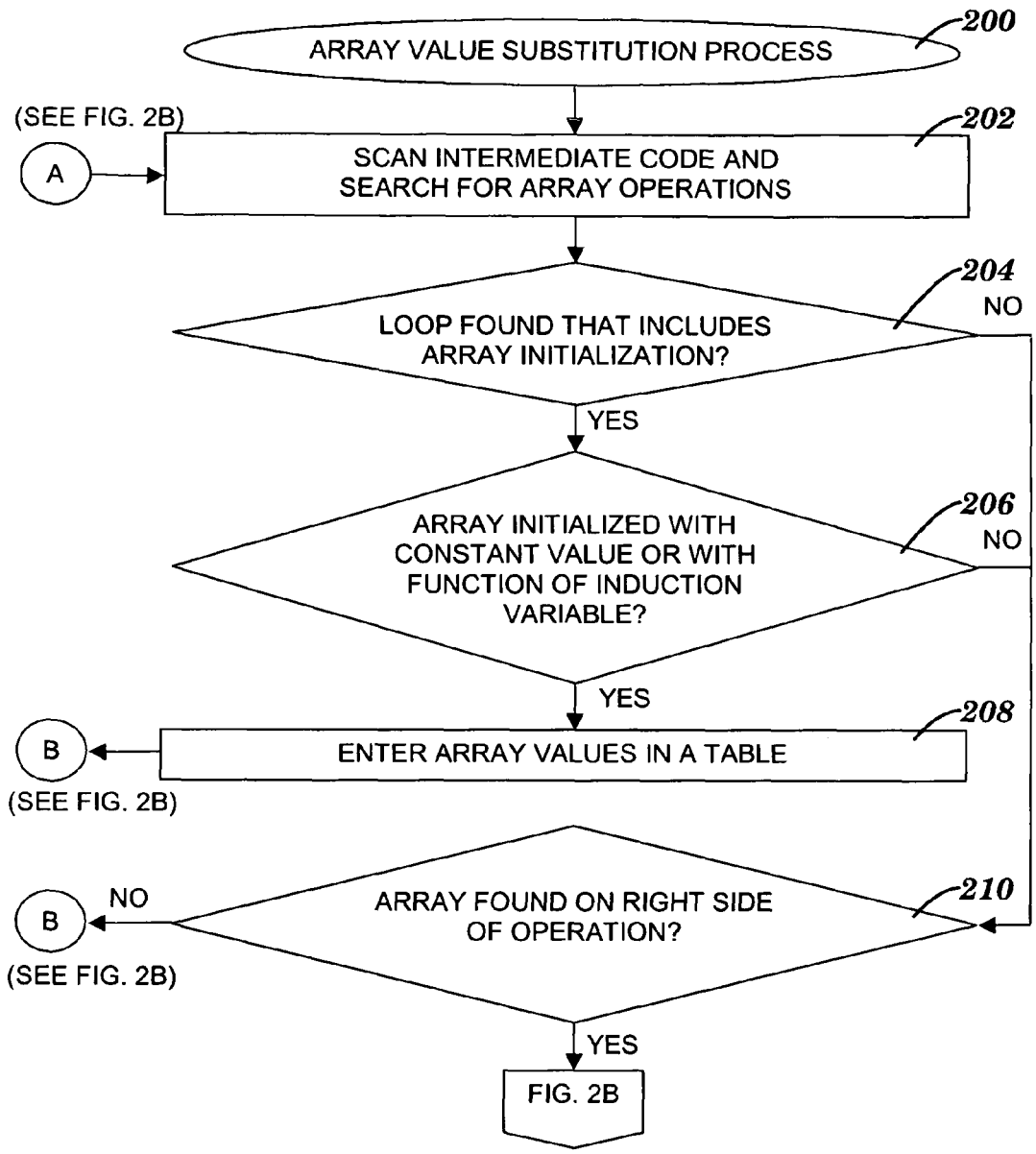
FIGS. 2A-2B depict a flow chart of a process for substituting array values and propagating the substituted values with loop transformations through static analysis, in accordance with embodiments of the present invention.
Figure 2B:
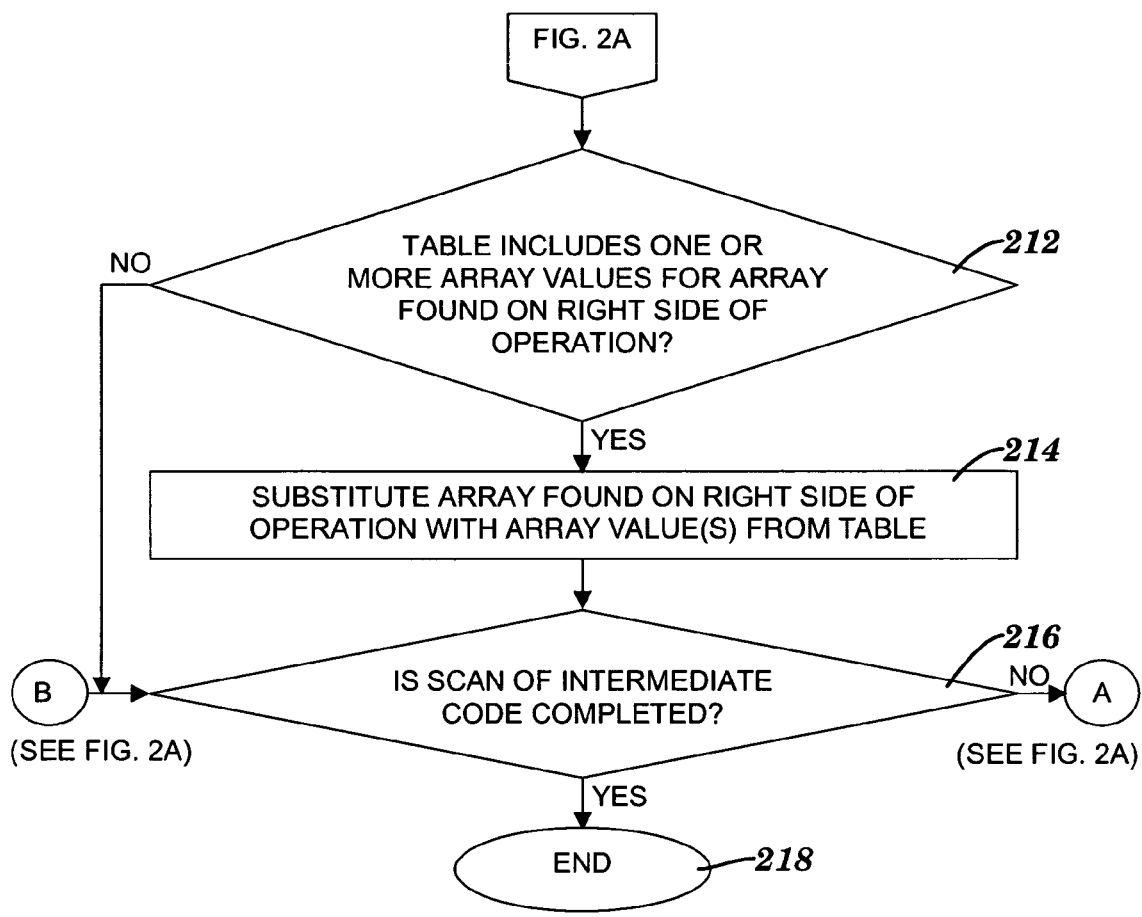

FIGS. 2A-2B depict a flow chart of a process for substituting array values and propagating the substituted values with loop transformations through static analysis, in accordance with embodiments of the present invention. The process of array value substitution starts at step 200 and is performed as a static analysis of a software program (e.g., performed entirely during a compile time of the software program). Each of the steps included in FIGS. 2A and 2B are performed by a software tool that is added to a compiler. In one embodiment, the software tool is added to an optimizer component of the compiler. In another embodiment, the software tool is added to a code generator of the compiler.

In step 202, an intermediate representation (i.e., intermediate code) of the software program is scanned by the software tool added to the compiler. In an alternate embodiment, the code scanned in step 202 is source code of the software program.

The scanning of step 202 searches for array operations in the scanned code. If inquiry step 204 determines that an array operation found in step 202 includes an array initialization statement within a loop, then inquiry step 206 determines if the initialization statement found in step 204 is to initialize (i.e., during an execution of the software program) the elements of the array to be expressions (a.k.a. array values), where each expression is either a constant value or a function of the induction variable of the loop that includes the initialization statement. As used herein, an induction variable is defined as a variable that is incremented or decremented a fixed size on every iteration of a loop or that is a linear function of another induction variable. An induction variable is capable of being evaluated at execution time to each value of a set of values that range from a lower bound to an upper bound. It should be noted that the term "array value" as used herein is not limited to referring to a constant value known at compile time; it can also refer to an expression that is a function of an induction variable where the expression is to be evaluated at execution time.

Hereinafter, "initialize" and "assign" and their respective variants refer to the actions of (1) initializing arrays and (2) assigning expressions or array elements, which are performed during an execution of the aforementioned software program. Such an execution occurs subsequent to the array value substitution process of FIGS. 2A-2B.

A loop found in the scanning of step 202 is, for example, in a format shown in the pseudo-code below:

```
for( iv=lb ; iv<ub ; iv++)
{
    arr[iv]=constant value or function(iv)
}
```

In the pseudo-code shown above, iv is the induction variable, ub indicates the upper bound of the loop's iterations, lb indicates the lower bound of the loop's iterations, and arr is the array that is to be initialized by the loop.

In the pseudo-code presented above, the loop includes only one basic block. The present invention is also capable of providing a static analysis with array value substitution for an array that is initialized over multiple basic blocks in a loop found by the scanning of step 202. Static analysis associated with multiple basic blocks is described in the section below entitled Array Analysis Across Basic Blocks.

If step 206 determines that the statement found in step 204 initializes at least one element of the array with an expression that is a constant value or a function of the induction variable of the loop, then the expression that initializes the at least one element is entered into a data storage table in step 208. The table is stored in, for example, heap storage allocated by the compiler that compiles the source program whose intermediate code is scanned in step 202. Hereinafter, any reference to "the table" refers to the table of step 208.

In a first case, the table associates the stored expression with a lower bound value and an upper bound value that determine a plurality of indices (e.g., a series of consecutive indices) of the array whose initialization is identified in step 204. The lower bound and upper bound values in the table are dependent upon the lower and upper bounds, respectively, of the loop found in step 202 and whose format matches the pseudo-code presented above. That is, the lower and upper bound values of the table may equal the lower and upper bounds of the loop, respectively, or the lower and upper bound values of the table may depend upon a function of the lower and upper bounds of the loop, respectively.

In a second case, the table stores expressions (i.e., constants or functions of induction variables) and associates each of the stored expressions with a conditional expression. The conditional expression is included, for example, in a loop that includes multiple basic blocks. Hereinafter, the lower and upper bounds stored in the table (i.e., the first case described above) and the conditional expression stored in the table (i.e., the second case described above) are also referred to as constraints which can be compared to constraints associated with a loop.

If inquiry step 204 determines that the array operation found in step 202 is not a loop that includes an array initialization, or if inquiry step 206 determines that the array initialization statement determined by step 204 does not initialize the array with a constant value or a function of the aforementioned induction variable, then the array value substitution process continues with inquiry step 210. If step 210 determines that the array operation found in step 202 is an assignment statement that includes at least one array element being assigned, then the array value substitution process continues in FIG. 2B. Hereinafter, at least one array element being assigned is also referred to as an array found on the right side of an operation.

Continuing the array value substitution process in FIG. 2B, if inquiry step 212 determines that the table of step 208 (see FIG. 2A) includes one or more expressions associated with the array found on the right side of the operation found in step 202 (see FIG. 2A), then the array element(s) located on the right side of the operation (see step 210 of FIG. 2A) are substituted in step 214 with the one or more expressions of the table determined in step 212. That is, step 214 substitutes the array on the right side of the operation with one or more array values stored in the table of step 208 (see FIG. 2A).

In one embodiment, the array operation detected in step 210 is found in a loop (hereinafter referred to as the array operation loop). In this embodiment, the substitution of array values in step 214 is performed in response to step 212 only if the constraints of the array operation loop match or are subsumed (i.e., included) within the constraints of a data item of an entry in the table, where the table entry is associated with the array being assigned by the array operation (e.g., the array on the right side of the array operation). Otherwise, the substitution in step 214 is delayed until after the array operation loop is restructured (i.e., transformed) into multiple loops whose constraints match or are subsumed within constraints in the table entry described above (see the example discussed below relative to FIG. 3C).

As an example, an array operation loop assigns the value of 3 to an array a, and includes constraints indicated by an induction variable that ranges in values from 0 to 99. In this example, the constraints of the array operation loop match the constraints of a data item in a table entry associated with array a if the constraints of the data item include a lower bound value of 0 and an upper bound value of 99. Further, the constraints of the array operation loop are subsumed within the constraints of the data item if the constraints of the data item include a lower bound value of 0 and an upper bound value of 150. In this case, the range of values 0 to 99 is subsumed by the range of values 0 to 150 because the range 0 to 99 is a proper subset of the range 0 to 150.

After performing the array value substitution in step 214, or after step 212 determines that the table does not include any expressions associated with the array found on the right side of the operation, step 216 determines if the scan of the intermediate code is completed. If the scan is complete, the array value substitution process ends at step 218. Otherwise, the process repeats starting at step 202 (see FIG. 2A). The inquiry of step 216 also follows step 208 (see FIG. 2A) (i.e., entry of array values in the table) and the No branch of inquiry step 210 (see FIG. 2A) (i.e., the array in the operation of step 202 of FIG. 2A is not on the right side of the operation).

In one embodiment, an execution of the software program is performed subsequent to a completion of the array value substitution process of FIGS. 2A-2B. During this execution of the program, if the expression retrieved from the table and used in the substitution of step 214 is a constant, the expression is loaded only once into a register before the execution of the program enters a loop that includes the assignment statement of step 210 (see FIG. 2A). While executing the loop that includes the assignment statement, the expression is moved from the register to an array that is assigned the expression by the assignment statement. Thus, the present invention improves execution time by avoiding the multiple memory accesses that are needed by a conventional scheme to retrieve values of elements of the array that had been initialized with a constant value. Alternatively, if the expression depends on a function of an induction variable, then an initial value is loaded into a register at execution time and the register is incremented according to the function of the induction variable. Improved performance is also present in this alternative case, as the arithmetic operations related to incrementing the register are cheaper in terms of time than conventional memory accesses.

Examples

FIG. 3A is an example of an entry in a table that stores array values in the process of FIGS. 2A-2B, where the entry is based on values being assigned to an array in a first loop, in accordance with embodiments of the present invention. A table residing in a memory allocated by the compiler of FIG. 1 stores array value information that includes entries associated with each array that meets two pre-requisites:

(1) The array includes a plurality of elements in a form that can be stored efficiently. In one embodiment, the form is either a constant value of a function of the induction variable of the loop that is executed to initialize the array.

(2) The plurality of elements in (1) can be stored in the array in contiguous memory locations to facilitate loop restructuring.

In one embodiment, the structure for one entry associated with a one-dimensional array utilizes data items in the following format:

Symbol ID Lower:Upper:Expression

In the table entry format shown above, Symbol ID identifies an array, Expression is a constant value or a function of the induction variable of the loop that initializes the array, Lower indicates the lower bound of the array indices denoting the array elements being initialized to Expression, and Upper indicates the upper bound of the array indices denoting the array elements being initialized to Expression. As each expression in the table is associated with a range of array elements denoted by a range of indices, the table does not need to store multiple copies of expressions (i.e., each element of the array is not associated with a separately stored expression in the table).

The table entry format shown above can be extended to include multiple data items of the form Lower:Upper:Expression. For example, a loop is to be executed to initialize a first group of array elements to a first expression and the same loop or a different loop is to be executed to initialize a second group of array elements to a second expression, where the first group of array elements is associated with a first series of consecutive memory locations and the second group of array elements is associated with a second series of consecutive memory locations, and where the first and second sets are mutually exclusive. In this example, a table entry for the array includes data items of the form Lower1:Upper1:Expression1 and Lower2:Upper2:Expression2.

As will be readily apparent to those skilled in the art, the table entry format shown above can be extended to indicate expressions to be assigned to multi-dimensional arrays.

In one embodiment, each entry in the table includes a linked list, where the linked list stores each data item being entered in the table in step 208 of FIG. 2A.

As a first example of array value substitution using the process of FIGS. 2A-2B, consider a first loop in Code Example 1 presented below.

Code Example 1:

```
for( i = 0 ; i < 100 ; i++)
{
   a[i] = 3;
}
```

The initialization of array a in Code Example 1 is identified, the constant value of 3 to be assigned to the array is identified, and an entry 300 of FIG. 3A is stored in the table. In this example, entry 300 includes an identifier "a" to identify the array a, "0:99:3" to indicate that a loop has been identified (i.e., the first loop shown in Code Example 1) where 3 is the constant value expression that is to initialize array a from a[0] to a[99], inclusive. The NULL data item in entry 300 indicates the end of the linked list of data items in the form Lower:Upper:Expression.

An entry 320 of FIG. 3B is a modification of the table entry of FIG. 3A based on values being assigned in a second loop, which is identified during static analysis subsequent to the identification of the first loop. The second loop is shown in Code Example 2, which is presented below.

Code Example 2:

```
for( i = 0 ; i < 50 ; i++)
{
   a[i] = 9;
}
```

Like the loop in Code Example 1, a constant value (i.e., 9) is assigned in the loop in Code Example 2 to elements of array a, where the elements have consecutive indices. In this case, only the array elements associated with indices 1 through 49, inclusive, are assigned the constant value of 9. The remaining array elements (i.e., the elements with indices 50 to 99) are still assigned the constant value of 3 based on the first loop of Code Example 1. Subsequent to identifying the loop in Code Example 2, the static analysis changes the table entry of FIG. 3A into entry 320. The 0:49:9 data item is inserted in the linked list to indicate that 9 is assigned to a[0] through a[49]. The former data item of 0:99:3 (see entry 300 of FIG. 3A) is changed to 50:99:3 to indicate that the constant value of 3 from the first loop is still being assigned to a[50] through a[99], but 3 is no longer being assigned to a[0] through a[49].

Subsequent to the static analysis identification of the loop in Code Example 2, a copy loop is identified that includes an assignment statement that copies values of elements of array a into an array b. The copy loop is presented below in Code Example 3.

Code Example 3:

```
for( i = 0 ; i < 100 ; i++)
{
   b[i] = a[i];
}
```

The table is scanned for an entry that includes an identifier that matches the name of the array whose elements are being assigned in the copy loop in Code Example 3. In one embodiment, this scanning is equivalent to scanning the table for an entry that includes an identifier that matches the array name on the right side of the detected assignment statement. In this case, the scanning process locates entry 320, which corresponds to array a. Since entry 320 includes two data items in the linked list (i.e., 0:49:9 and 50:99:3), the copy loop is restructured by splitting the loop to efficiently assign values to array b. The result of the copy loop restructuring is presented below in Code Example 4.

Code Example 4:

```
for( i = 0 ; i < 50 ; i++)
{
   b[i] = 9;
}
for( 1 = 50 ; i < 100 ; i++)
{
   b[i] = 3;
}
```

Since the loops in Code Example 4 also include an initialization of array b, the table is modified to include an entry to correspond to array b. The modified table is, for example, table 340 of FIG. 3C, which includes a first entry that matches entry 320 of FIG. 3B and a second entry that includes an identifier of array b and two data items in a linked list that indicate the two loops in the result of the aforementioned restructuring of the copy loop (i.e., Code Example 4). For example, the 0:49:9 data item of the second entry in table 340 indicates that the constant value of 9 is to be assigned to b[0] through b[49].

A restructuring of a copy loop during the static analysis of the present invention may not include a splitting of a copy loop into more than one loop. For example, consider the above example without the second loop (i.e., the loop of Code Example 2) being identified before the copy loop is detected. In this alternate example, the copy loop would be restructured without splitting into two loops. That is, the scanning process finds entry 300 of FIG. 3A instead of entry 320 of FIG. 3B, retrieves the constant value 3 and substitutes 3 for the a[i] in the restructured copy loop.

As indicated above, it is not necessary that the array initialization include an assignment of a constant. Instead, the initialization may assign a function of an induction variable of the loop in which the array initialization is performed. For example, consider the loop shown below in Code Example 5, which assigns the induction variable i to the elements of the array c.

---
Code Example 5:
---
```
for( i = 50 ; i < 100 ; i++)
{
    c[i] = i;
}
```
---

An entry 400 of FIG. 4 is stored in the table to correspond to the loop shown above in Code Example 5. Entry 400 includes an identifier c that matches the name of the array being assigned values and the data item 50:99:i indicates that the expression i is to be assigned to c[50] through c[99], inclusive.

Array Analysis Across Basic Blocks

FIG. 5A is an example of three initial entries in a table 500 that stores array values in the process of FIGS. 2A-2B, where the initial entries are stored prior to analyzing arrays across basic blocks, in accordance with embodiments of the present invention. Table 500 includes entries corresponding to arrays a, b and c.

Consider Code Example 6 presented below, which has four basic blocks within a loop (i.e., the third through the sixth lines of the code). The state of the table before the compiler add-on detects the loop in Code Example 6 is depicted in FIG. 5A.

---
Code Example 6:
---
```
for( i = 0 ; i < 100 ; i++)
{
    if(c[i] < 50)
        c[i] = c[i]+a[i];
    else
        c[i] = b[i];
}
```
---

In this case, the value of array c is dependent on its previous value. Therefore, a modified table entry for array c based on the code presented above cannot utilize a data item in the simple form of Lower:Upper:Expression. Instead, the modified table entry utilizes a data item with three expressions that can be used in subsequent substitutions. The data item in the modified table entry is in the following format:

conditional expression:expression when condition is true: expression when condition is false.

This format is shown in the modified table entry for array c, which is the third entry of a table 520 of FIG. 5B.

In this example, a second copy loop is detected subsequent to the identification of the above-described loop having four basic blocks. Code Example 7 includes the second copy loop.

---
Code Example 7:
---
```
for( i = 0 ; i < 100 ; i++)
{
    b[i] = c[i]
}
```
---

Table 520 of FIG. 5B is scanned to retrieve the expressions included in the entry for array c. Using the retrieved expressions, the loop in Code Example 7 is restructured into a loop in Code Example 8, which is presented below.

---
Code Example 8:
---
```
for( i = 0 ; i < 100 ; i++)
{
    if(c[i]<50)
        b[i] = i+10+i;
    else
        b[i]=i*i
}
```
---

The loop in Code Example 8 has four basic blocks (i.e., the third through sixth lines of Code Example 8). By means of the transformation to the loop in Code Example 8, the information in the multiple basic blocks of Code Example 6 is analyzed statically and propagated to a loop that also has multiple basic blocks (i.e., the loop in Code Example 8).

Based on the transformation of the loop in Code Example 7 to the loop in Code Example 8, the entry for array b is modified in the table. The modified entry is shown as the second entry in table 540 in FIG. 5C. Note that each entry in table 540 is in the format expr:expr:expr, where each expr is (1) a simplex expression (e.g., a constant such as 99 or a variable such as i); a conditional expression (e.g., a<10); or (3) an expression that includes one or more expressions (e.g., c*i+b).

Interprocedural Array Analysis

The array value substitution technique of the present invention can also be applied to procedures that have arrays passed into them as parameters. The table storing array values is a maintained as a global structure. Subsequent to an array being declared and initialized, entries in the table are created. Subsequent to exiting a procedure, entries are removed from the table for all those arrays that had been local to the exited procedure. Advantageously, this scheme provides that whenever a value of an array is modified in a callee procedure, the value is automatically updated in the table. This updated value is available in the caller procedure after exiting the callee procedure. That is, the updated value is available to be substituted for the previously stored value in the program. As the table is maintained globally instead of being instantiated for a callee procedure, multiple entries for the same array are avoided, thereby facilitating a memory efficient storage of the array values.

In a first example of interprocedural analysis, no local arrays are associated with a called procedure. The interprocedural array analysis starts with the following call to a procedure named function1:

function1(a,b,c,50);

FIG. 6A is an example of three initial entries in a table 600 that stores array values in the process of FIGS. 2A-2B, where the initial entries are stored prior to the interprocedural array analysis.

The definition of function1 is presented below in Code Example 9.

---
Code Example 9:
---
```
function1(arr x,arr y,arr z,int size)
{
    for( i=0 ; i<size ; i++)
    {
        x[i] = y[i] + z[i];
    }
}
```
---

In this interprocedural array analysis example, there are no local arrays. As all of the three arrays (i.e., a, b, and c) are passed to function1 as parameters, no new entries need to be created in the table. Only existing table entries need to be modified.

The table entry associated with the loop in Code Example 9 initially includes a data item in the form 0:size:y[i]+z[i] which corresponds to array x. Before making an entry into the table, the function definition parameters (i.e., x, y, z and size) are mapped to the called values (i.e., a, b, c and 50). Thus, x is mapped to array a, y is mapped to array b, z is mapped to array c and size is mapped to 50. After mapping the parameters, the corresponding entries from the table are looked up for each array to make the relevant substitution. In this case, the table entry for array a is transformed so that data item 0:99:i (see FIG. 6A) is replaced with data items 0:49:(i*i)+(i+10) and 50:99:i. The result of this transformation of the table entry for array a is shown in table 620 of FIG. 6B.

In a second example of interprocedural analysis, a local array is associated with a called procedure. The interprocedural array analysis of the second example starts with a call to a procedure named function2. The definition of function2 is shown below in Code Example 10.

---
Code Example 10:
---
```
function2 (int size)
{
    int array x[500];
    int reduc = 0;
    for(int i=0;i<size;i++)
    {
        x[i] = (i-1)*(i+1);
    }
    for(int i=0;i<size;i++)
    {
        reduc = reduc+x[i];
    }
}
```
---

Since the definition of function2 has a local array (i.e., array x), an entry needs to be created in the table. However, upon exiting function2, the created entry is deleted from the table.

In this example, the table is empty before function2 is identified. After identifying the first loop of function2, an entry is created in the table for array x as shown in a table 640 of FIG. 6C. In response to identifying the second loop of function2, the expression (i−1)*(i+1) from the table is substituted for x[i] in the second loop. The second loop is transformed into the loop in Code Example 11, which is presented below.

---
Code Example 11:
---
```
for(int i=0;i<size;i++)
{
    reduc = reduc+(i-1)*(i+1);
}
```
---

After completing a scan of a function, all entries for the local array in the function are deleted from the table. In the second example of interprocedural array analysis, after completing the scan of function2, the entry for array x (i.e., the array local to function2) is deleted from the table. In this example, the table is again empty after completing the analysis of function2.

Computing System

Figure 7:
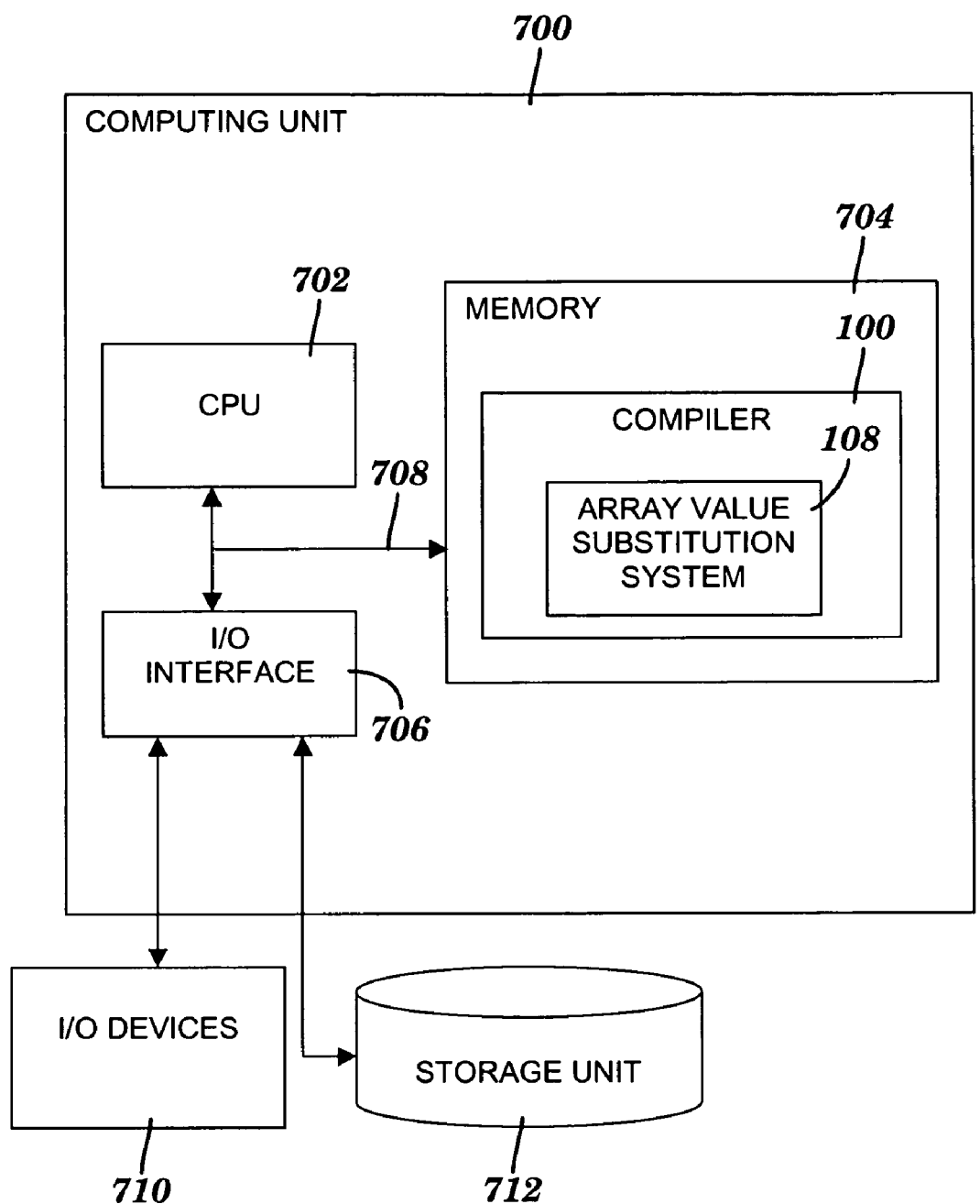
FIG. 7 is a block diagram of a computing unit for implementing the process of FIGS. 2A-2B, in accordance with embodiments of the present invention.

FIG. 7 is a block diagram of a computing unit 700 for implementing the process of FIGS. 2A-2B, in accordance with embodiments of the present invention. Computing unit 700 generally comprises a central processing unit (CPU) 702, a memory 704, an input/output (I/O) interface 706, a bus 708, I/O devices 710 and a storage unit 712. CPU 702 performs computation and control functions of computing unit 700. CPU 702 may comprise a single processing unit, or be distributed across one or more processing units in one or more locations (e.g., on a client and server).

Memory 704 may comprise any known type of data storage and/or transmission media, including bulk storage, magnetic media, optical media, random access memory (RAM), read-only memory (ROM), a data cache, a data object, etc. Cache memory elements of memory 704 provide temporary storage of at least some program code in order to reduce the number of times code must be retrieved from bulk storage during execution. Storage unit 712 is, for example, a magnetic disk drive or an optical disk drive that stores data. Moreover, similar to CPU 702, memory 704 may reside at a single physical location, comprising one or more types of data storage, or be distributed across a plurality of physical systems in various forms. Further, memory 704 can include data distributed across, for example, a LAN, WAN or storage area network (SAN) (not shown).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing unit 700, and may comprise any type of transmission link, including electrical, optical, wireless, etc.

I/O interface 706 also allows computing unit 700 to store and retrieve information (e.g., program instructions or data) from an auxiliary storage device (e.g., storage unit 712). The auxiliary storage device may be a non-volatile storage device (e.g., a CD-ROM drive which receives a CD-ROM disk). Computing unit 700 can store and retrieve information from other auxiliary storage devices (not shown), which can include a direct access storage device (DASD) (e.g., hard disk or floppy diskette), a magneto-optical disk drive, a tape drive, or a wireless communication device.

Memory 704 includes computer program code comprising compiler 100. The program code of array value substitution system 108 residing within compiler 100 implements the array value substitution process of FIGS. 2A-2B. Further, memory 704 may include other systems not shown in FIG. 7, such as an operating system (e.g., Linux) that runs on CPU 702 and provides control of various components within and/or connected to computing unit 700.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of compiler 100 for use by or in connection with a computing unit 700 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 704, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the array value substitution method of the present invention. Thus, the present invention discloses a process for supporting computer infrastructure, comprising integrating, hosting, maintaining and deploying computer-readable code into a computing system (e.g., computing unit 700), wherein the code in combination with the computing system is capable of performing a method of substituting array values in a program at compile time.

In another embodiment, the invention provides a business method that performs the process steps of the invention on a subscription, advertising and/or fee basis. That is, a service provider, such as a Solution Integrator, can offer to create, maintain, support, etc. an array value substitution method of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of substituting array values in a program in a computing environment at compile time, comprising:

identifying an initialization of an array, said identifying performed at a compile time of a program being compiled by a compiler of a computer system, said initialization including an assignment of an expression to a plurality of elements of said array via a loop in said program, wherein said expression is selected from the group consisting of a constant value and a function of an induction variable of said loop, said induction variable capable of being evaluated to each value of a set of values;

storing, at said compile time and subsequent to said identifying said initialization of said array, said expression in a table residing in a memory, said table associating said expression with said array and with a plurality of indices of said array, said plurality of indices being dependent upon a subset of said set of values;

detecting, at said compile time and subsequent to said storing said expression in said table, at least one element of said plurality of elements of said array on the right side of an assignment statement included in said program, wherein said at least one element of said plurality of elements is to be assigned by said assignment statement, said at least one element associated with at least one index of said plurality of indices in a one-to-one correspondence, and wherein said assignment statement is different from said assignment of said expression to said plurality of elements of said array via said loop;

retrieving, at said compile time and in response to said detecting said at least one element on the right side of said assignment statement, said expression from said table, said retrieving based on said expression being associated by said table with said array and with said at least one index; and substituting, into said assignment statement included in said program and at said compile time, said expression retrieved from said table for said at least one element detected on the right side of said assignment statement so that said expression replaces said at least one element on the right side of said assignment statement and is to be assigned by an execution of said assignment statement instead of said at least one element being assigned by said execution of said assignment statement.

2. The method of claim 1, wherein said identifying comprises:

identifying said initialization based on said plurality of elements of said array being associated with a series of consecutive memory locations.

3. The method of claim 1, further comprising:

detecting said assignment statement within a second loop in said program, said assignment statement to be executed in said second loop to assign a set of elements of said array to a plurality of elements of a second array;

identifying an initialization of said second array via said second loop in response to said substituting, said initialization of said second array including an assignment of said expression to a plurality of elements of said second array via said second loop, said plurality of elements of said second array associated with a series of indices of said second array, and said series of indices associated with a first set of consecutive memory locations; and adding an entry to said table subsequent to said substituting, said entry including an identifier of said second array, a first value indicating a lower bound of said series of indices, a second value indicating an upper bound of said series of indices, and said expression.

4. The method of claim 3, further comprising:
identifying a second initialization of said array, said second initialization including an assignment of a second expression to a subset of said plurality of elements, said subset identified by consecutive indices of said array, said consecutive indices ranging from a lower bound indicated by a third value and an upper bound indicated by a fourth value;
restructuring said second loop into multiple loops based on said identifying said second initialization;
adding said third value, said fourth value and said second expression to said entry in response to said restructuring, said third value and said fourth value indicating a second series of indices of said array, and said second series of indices associated with a second set of consecutive memory locations; and
modifying, based on said restructuring, at least one of said first value and said second value in said entry to generate a third series of indices, wherein said second series and said third series are mutually exclusive.

5. The method of claim 1, further comprising:
identifying a call to a callee procedure of said program from a caller procedure of said program, said call including said array as a parameter of said call;
identifying an initialization of a second array in a second loop in said callee procedure, said second array not being an array local to said callee procedure;
storing a second expression in said table, said table associating said second expression with said second array and a set of constraints associated with said second loop;
mapping said second array to said array based on said array being said parameter;
modifying said table to include said second expression associated with said array and with a subset of indices of said plurality of indices;
retrieving said second expression from said table; and
substituting said second expression for said expression in said program.

6. The method of claim 1, further comprising:
identifying a call to a callee procedure of said program from a caller procedure of said program, said call including one or more constraints as one or more parameters of said call;
identifying a second initialization of a second array in a second loop in said callee procedure, said second array being an array local to said callee procedure, said second initialization including an assignment of a second expression to said second array;
creating a new entry in said table, said new entry including an identifier of said second array and a data item that associates said second expression with constraints associated with said second loop;
identifying a third initialization of a third array in a third loop in said callee procedure, said third initialization including an assignment of a third expression to said third array, said third expression including said second array;
retrieving said second expression from said table in response to said identifying said third initialization;
substituting said second expression for said second array in said assignment of said third expression; and
deleting said new entry from said table in response to said substituting and in response to a completion of a scan of said callee procedure for array operations, said scan being complete when no array operation in said callee procedure remains to be identified.

7. The method of claim 1, further comprising:
identifying a second initialization of said array in a second loop, said second initialization to be performed via a conditional expression that includes a first plurality of basic blocks, said second initialization including a first assignment of a first expression to a first set of consecutive elements of said array if said conditional expression is true and a second assignment of a second expression to a second set of consecutive elements of said array if said conditional expression is false,
wherein said first assignment and said second assignment are included in different basic blocks of said first plurality of basic blocks, and
wherein said first expression and said second expression are each a constant value or a function of an induction variable of said second loop;
storing said conditional expression, said first expression and said second expression in a single data item in said table, said data item associated with said array;
detecting a second assignment statement in a third loop in said program, wherein one or more elements of said array are to be assigned by said second assignment statement;
retrieving said conditional expression, said first expression and said second expression from said single data item; and
restructuring, subsequent to said retrieving, said third loop into a second plurality of basic blocks based on said single data item, said restructuring including completing a propagation of said first expression and said second expression from said first plurality of basic blocks to said second plurality of basic blocks.

8. A computer system comprising:
a processor; and
a computer readable memory unit coupled to said processor, said memory unit containing instructions that when carried out by said processor implement a method of substituting array values in a program in a computing environment at compile time, said method comprising:
identifying an initialization of an array, said identifying performed at a compile time of a program being compiled by a compiler, said initialization including an assignment of an expression to a plurality of elements of said array via a loop in said program, wherein said expression is selected from the group consisting of a constant value and a function of an induction variable of said loop, said induction variable capable of being evaluated to each value of a set of values;
storing, at said compile time and subsequent to said identifying said initialization of said array, said expression in a table residing in a memory, said table associating said expression with said array and with a plurality of indices of said array, said plurality of indices being dependent upon a subset of said set of values;
detecting, at said compile time and subsequent to said storing said expression in said table, at least one element of said plurality of elements of said array on the right side of an assignment statement included in said program, wherein said at least one element of said plurality of elements is to be assigned by said assignment statement, said at least one element associated with at least one index of said plurality of indices in a one-to-one correspondence, and wherein said assignment statement is different from said assignment of said expression to said plurality of elements of said array via said loop;

retrieving, at said compile time and in response to said detecting said at least one element on the right side of said assignment statement, said expression from said table, said retrieving based on said expression being associated by said table with said array and with said at least one index; and substituting, into said assignment statement included in said program and at said compile time, said expression retrieved from said table for said at least one element detected on the right side of said assignment statement so that said expression replaces said at least one element on the right side of said assignment statement and is to be assigned by an execution of said assignment statement instead of said at least one element being assigned by said execution of said assignment statement.

9. The system of claim 8, wherein said identifying comprises:
identifying said initialization based on said plurality of elements of said array being associated with a series of consecutive memory locations.

10. The system of claim 8, wherein said method further comprises:
detecting said assignment statement within a second loop in said program, said assignment statement to be executed in said second loop to assign a set of elements of said array to a plurality of elements of a second array;
identifying an initialization of said second array via said second loop in response to said substituting, said initialization of said second array including an assignment of said expression to a plurality of elements of said second array via said second loop, said plurality of elements of said second array associated with a series of indices of said second array, and said series of indices associated with a first set of consecutive memory locations; and
adding an entry to said table subsequent to said substituting, said entry including an identifier of said second array, a first value indicating a lower bound of said series of indices, a second value indicating an upper bound of said series of indices, and said expression.

11. The system of claim 10, wherein said method further comprises:
identifying a second initialization of said array, said second initialization including an assignment of a second expression to a subset of said plurality of elements, said subset identified by consecutive indices of said array, said consecutive indices ranging from a lower bound indicated by a third value and an upper bound indicated by a fourth value;
restructuring said second loop into multiple loops based on said identifying said second initialization;
adding said third value, said fourth value and said second expression to said entry in response to said restructuring, said third value and said fourth value indicating a second series of indices of said array, and said second series of indices associated with a second set of consecutive memory locations; and
modifying, based on said restructuring, at least one of said first value and said second value in said entry to generate a third series of indices, wherein said second series and said third series are mutually exclusive.

12. The system of claim 8, wherein said method further comprises:
identifying a call to a callee procedure of said program from a caller procedure of said program, said call including said array as a parameter of said call;
identifying an initialization of a second array in a second loop in said callee procedure, said second array not being an array local to said callee procedure;
storing a second expression in said table, said table associating said second expression with said second array and a set of constraints associated with said second loop;
mapping said second array to said array based on said array being said parameter;
modifying said table to include said second expression associated with said array and with a subset of indices of said plurality of indices;
retrieving said second expression from said table; and
substituting said second expression for said expression in said program.

13. The system of claim 8, wherein said method further comprises:
identifying a call to a callee procedure of said program from a caller procedure of said program, said call including one or more constraints as one or more parameters of said call;
identifying a second initialization of a second array in a second loop in said callee procedure, said second array being an array local to said callee procedure, said second initialization including an assignment of a second expression to said second array;
creating a new entry in said table, said new entry including an identifier of said second array and a data item that associates said second expression with constraints associated with said second loop;
identifying a third initialization of a third array in a third loop in said callee procedure, said third initialization including an assignment of a third expression to said third array, said third expression including said second array;
retrieving said second expression from said table in response to said identifying said third initialization;
substituting said second expression for said second array in said assignment of said third expression; and
deleting said new entry from said table in response to said substituting and in response to a completion of a scan of said callee procedure for array operations, said scan being complete when no array operation in said callee procedure remains to be identified.

14. The system of claim 8, wherein said method further comprises:
identifying a second initialization of said array in a second loop, said second initialization to be performed via a conditional expression that includes a first plurality of basic blocks, said second initialization including a first assignment of a first expression to a first set of consecutive elements of said array if said conditional expression is true and a second assignment of a second expression to a second set of consecutive elements of said array if said conditional expression is false,
wherein said first assignment and said second assignment are included in different basic blocks of said first plurality of basic blocks, and
wherein said first expression and said second expression are each a constant value or a function of an induction variable of said second loop;

storing said conditional expression, said first expression and said second expression in a single data item in said table, said data item associated with said array;

detecting a second assignment statement in a third loop in said program, wherein one or more elements of said array are to be assigned by said second assignment statement;

retrieving said conditional expression, said first expression and said second expression from said single data item; and restructuring, subsequent to said retrieving, said third loop into a second plurality of basic blocks based on said single data item, said restructuring including completing a propagation of said first expression and said second expression from said first plurality of basic blocks to said second plurality of basic blocks.

15. A computer program product comprising a non-transitory computer-usable medium including computer-usable program code for substituting array values in a program in a computing environment at compile time, the computer program product including:

computer-usable code for identifying an initialization of an array, said identifying performed at a compile time of a program being compiled by a compiler, said initialization including an assignment of an expression to a plurality of elements of said array via a loop in said program, wherein said expression is selected from the group consisting of a constant value and a function of an induction variable of said loop, said induction variable capable of being evaluated to each value of a set of values;

computer-usable code for storing, at said compile time and subsequent to said identifying said initialization of said array, said expression in a table residing in a memory, said table associating said expression with said array and with a plurality of indices of said array, said plurality of indices being dependent upon a subset of said set of values;

computer-usable code for detecting, at said compile time and subsequent to said storing said expression in said table, at least one element of said plurality of elements of said array on the right side of an assignment statement included in said program, wherein said at least one element of said plurality of elements is to be assigned by said assignment statement, said at least one element associated with at least one index of said plurality of indices in a one-to-one correspondence, and wherein said assignment statement is different from said assignment of said expression to said plurality of elements of said array via said loop;

computer-usable code for retrieving, at said compile time and in response to said detecting said at least one element on the right side of said assignment statement, said expression from said table, said retrieving based on said expression being associated by said table with said array and with said at least one index; and computer-usable code for substituting, into said assignment statement included in said program and at said compile time, said expression retrieved from said table for said at least one element detected on the right side of said assignment statement so that said expression replaces said at least one element on the right side of said assignment statement and is to be assigned by an execution of said assignment statement instead of said at least one element being assigned by said execution of said assignment statement.

16. The program product of claim 15, wherein said computer-usable code for identifying comprises:

computer-usable code for identifying said initialization based on said plurality of elements of said array being associated with a series of consecutive memory locations.

17. The program product of claim 15, further comprising:

computer-usable code for detecting said assignment statement within a second loop in said program, said assignment statement to be executed in said second loop to assign a set of elements of said array to a plurality of elements of a second array;

computer-usable code for identifying an initialization of said second array via said second loop in response to said substituting, said initialization of said second array including an assignment of said expression to a plurality of elements of said second array via said second loop, said plurality of elements of said second array associated with a series of indices of said second array, and said series of indices associated with a first set of consecutive memory locations; and computer-usable code for adding an entry to said table subsequent to said substituting, said entry including an identifier of said second array, a first value indicating a lower bound of said series of indices, a second value indicating an upper bound of said series of indices, and said expression.

18. The program product of claim 17, further comprising:

computer-usable code for identifying a second initialization of said array, said second initialization including an assignment of a second expression to a subset of said plurality of elements, said subset identified by consecutive indices of said array, said consecutive indices ranging from a lower bound indicated by a third value and an upper bound indicated by a fourth value;

computer-usable code for restructuring said second loop into multiple loops based on said identifying said second initialization;

computer-usable code for adding said third value, said fourth value and said second expression to said entry in response to said restructuring, said third value and said fourth value indicating a second series of indices of said array, and said second series of indices associated with a second set of consecutive memory locations; and computer-usable code for modifying, based on said restructuring, at least one of said first value and said second value in said entry to generate a third series of indices, wherein said second series and said third series are mutually exclusive.

19. The program product of claim 15, further comprising:

computer-usable code for identifying a call to a callee procedure of said program from a caller procedure of said program, said call including said array as a parameter of said call;

computer-usable code for identifying an initialization of a second array in a second loop in said callee procedure, said second array not being an array local to said callee procedure;

computer-usable code for storing a second expression in said table, said table associating said second expression with said second array and a set of constraints associated with said second loop;

computer-usable code for mapping said second array to said array based on said array being said parameter;

computer-usable code for modifying said table to include said second expression associated with said array and with a subset of indices of said plurality of indices;

computer-usable code for retrieving said second expression from said table; and computer-usable code for substituting said second expression for said expression in said program.

20. A process for supporting computing infrastructure, said process comprising providing at least one support service for at least one of creating, integrating, hosting, maintaining, and deploying computer-readable code in a computing system, wherein the code in combination with the computing system is capable of performing a method of substituting array values in a program in a computing environment at compile time, said method comprising:

identifying an initialization of an array, said identifying performed at a compile time of a program being compiled by a compiler, said initialization including an assignment of an expression to a plurality of elements of said array via a loop in said program, wherein said expression is selected from the group consisting of a constant value and a function of an induction variable of said loop, said induction variable capable of being evaluated to each value of a set of values;

storing, at said compile time and subsequent to said identifying said initialization of said array, said expression in a table residing in a memory, said table associating said expression with said array and with a plurality of indices of said array, said plurality of indices being dependent upon a subset of said set of values;

detecting, at said compile time and subsequent to said storing said expression in said table, at least one element of said plurality of elements of said array on the right side of an assignment statement included in said program, wherein said at least one element of said plurality of elements is to be assigned by said assignment statement, said at least one element associated with at least one index of said plurality of indices in a one-to-one correspondence, and wherein said assignment statement is different from said assignment of said expression to said plurality of elements of said array via said loop;

retrieving, at said compile time and in response to said detecting said at least one element on the right side of said assignment statement, said expression from said table, said retrieving based on said expression being associated by said table with said array and said at least one index; and substituting, into said assignment statement included in said program and at said compile time, said expression retrieved from said table for said at least one element detected on the right side of said assignment statement so that said expression replaces said at least one element on the right side of said assignment statement and is to be assigned by an execution of said assignment statement instead of said at least one element being assigned by said execution of said assignment statement.

* * * * *